United States Patent [19]

Ahlstone

[11] 4,168,852
[45] Sep. 25, 1979

[54] RING GASKET RETAINER FOR FLANGED CONNECTORS

[75] Inventor: Arthur G. Ahlstone, Ventura, Calif.
[73] Assignee: Vetco, Inc., Ventura, Calif.
[21] Appl. No.: 804,622
[22] Filed: Jun. 8, 1977
[51] Int. Cl.² .................................................. F16L 17/06
[52] U.S. Cl. .................... 285/336; 277/189; 277/180; 285/363; 285/379
[58] Field of Search .................. 285/18, 23, 24, 27, 285/336, 334.2, 379, 380, DIG. 18, 363; 277/9.5, 10, 11, 171, 180, 167.5, 189

[56] References Cited

U.S. PATENT DOCUMENTS

| 923,112 | 5/1909 | Brodie | 285/379 |
|---|---|---|---|
| 2,291,709 | 8/1942 | Goetze | 285/336 |
| 2,753,197 | 7/1956 | Loeffler | 285/336 |
| 2,863,679 | 12/1958 | Dunbar | 285/336 |
| 3,321,217 | 5/1967 | Ahlstone | 285/18 |
| 3,387,867 | 6/1968 | Rogers | 285/336 |
| 3,521,892 | 7/1970 | Sheesley et al. | 285/336 X |
| 3,603,617 | 9/1971 | Lochridge | 285/379 |
| 3,620,554 | 11/1971 | Ward et al. | 285/18 |
| 3,628,812 | 12/1971 | Larralde | 285/334.2 |
| 3,661,408 | 5/1972 | Gibbons | 285/18 |
| 3,857,572 | 12/1974 | Taylor et al. | 277/9.5 |

FOREIGN PATENT DOCUMENTS 46-35801  2/1968  Japan .................. 277/167.5

Primary Examiner—Dave W. Arola
Attorney, Agent, or Firm—Subkow and Kriegel

[57] ABSTRACT

A ring gasket is retained in position on a pipe connector flange with the ring gasket properly positioned for sealing engagement and loading between opposed circular grooves in the flange and a mating flange or member. The ring gasket is supported on one of the connector parts by a spacer ring or by a portion of the flange which effects a standoff between the connector parts when they are connected. In the case of a separate spacer ring, it is connected to the flange or supported adjacent to the groove by a support member adapted to be hand-held. The support for the ring gasket includes elements frictionally engaging or biting into the outer periphery of the ring gasket. The ring gasket has outer peripheral, oppositely tapered sealing surfaces loaded into sealing engagement with opposing companion surfaces forming the grooves in the flanges upon making up of the connection.

28 Claims, 9 Drawing Figures

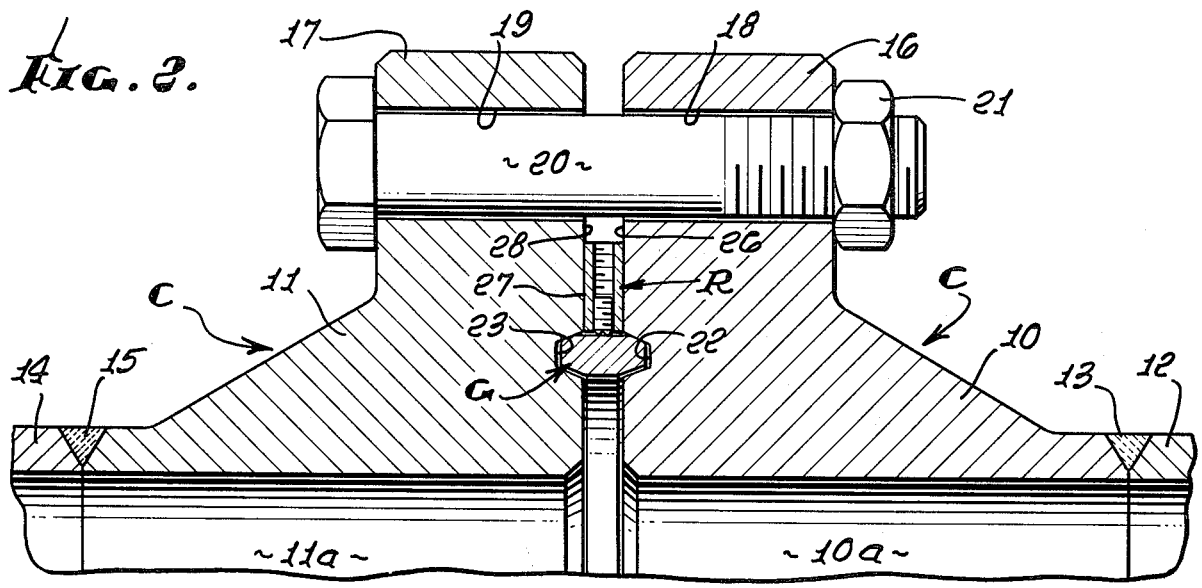

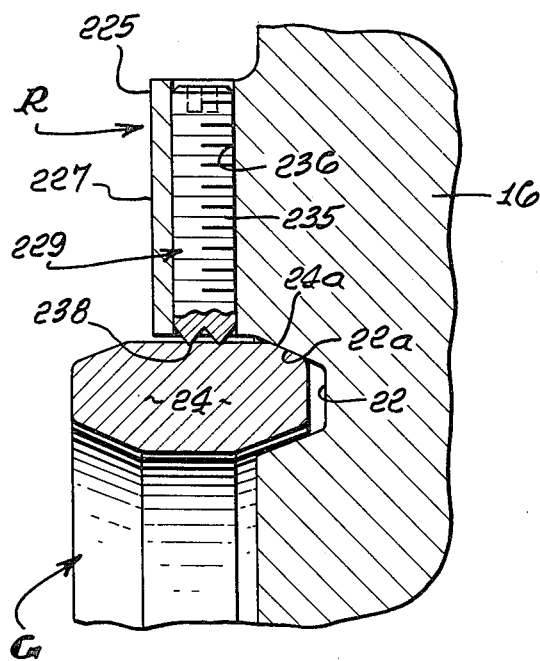
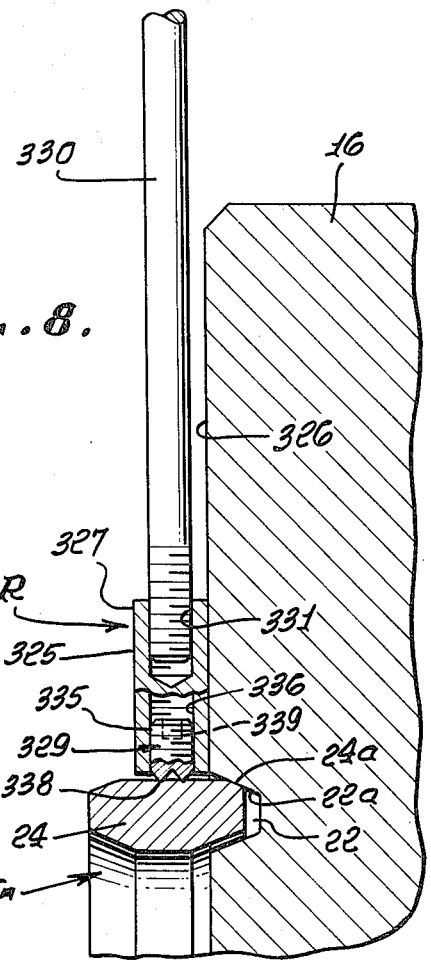
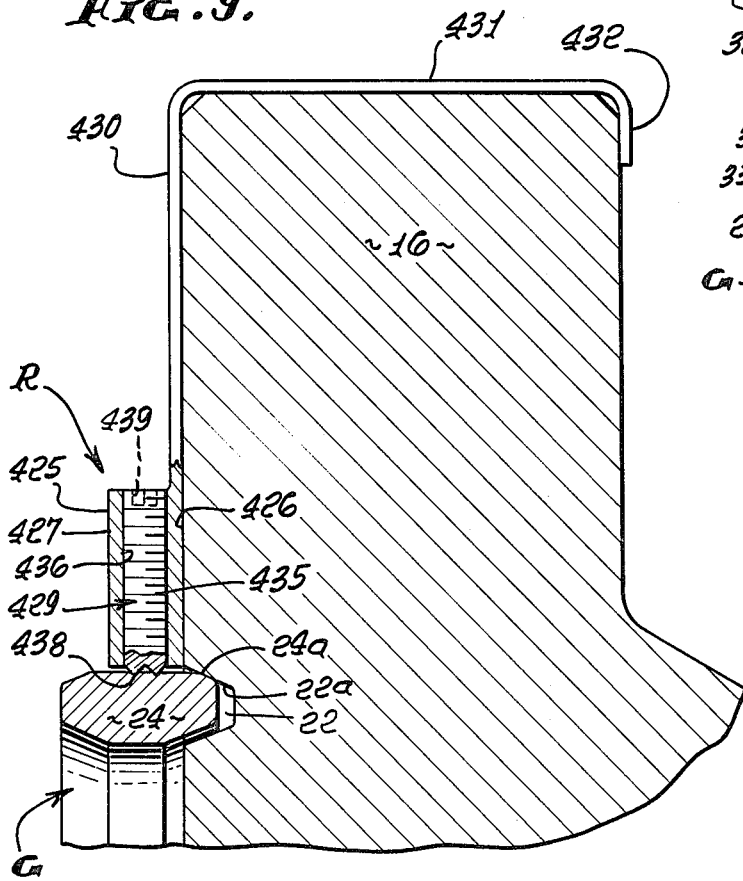

RING GASKET RETAINER FOR FLANGED CONNECTORS

BACKGROUND OF THE INVENTION

Flanged pipe connections for pipe lines, well heads and the like commonly involve the interconnection of opposed flanges or a flange and another member to engage and load a soft iron ring gasket in opposing circular grooves in the confronting flange or member surfaces. Such connectors are, for example, the subject of specifications of the American Petroleum Institute (API) and have become standardized.

When such connections are being made up with the flanges or members disposed horizontally or nearly horizontally, initial manual positioning or locating of the ring gasket in an upwardly opening circular groove is a relatively simple matter. The bringing or stabbing together of the connector parts may also be relatively simple. In the case of connections being made under stable conditions, on land, if the ring gasket tends to shift laterally it is also a simple matter to manually hold the ring gasket in place as the connector parts are moved together, although there is danger of hand or finger injury.

Such connections, however, are also being widely used in unstable or difficult environments, for example, for underwater pipe lines and connectors where divers are employed to make up the connectors, and the manual holding of the ring gasket in position is very difficult and tricky, particularly if the diver or divers are required to manually push or pull on the connector parts to bring them into position for connection. The problems are accentuated where the connector is being made up in a horizontal or other non-vertical pipe line or connector.

The present invention relates to the provision of means for initially positioning and locating a ring gasket with respect to the circular groove in one flange connector part, so that the ring gasket is properly positioned for sealing engagement in both of the opposed circular grooves of the companion connector parts when the connector is made up.

More particularly, the invention provides means for supporting the ring gasket on or adjacent to one of the connector parts, so that the ring gasket remains in proper position for engagement in the grooves of the connector parts, without regard for the angle at which the connector parts may be disposed during makeup. Accordingly, in the case of an underwater connection made up by a diver or divers, the difficult task of manually positioning the ring gasket between the flanges and the hazard to the hands are avoided. The invention renders more safe the making up of such connections even under more stable or surface conditions, and even when the connector parts are on vertical axes, the locating of the ring gasket for proper engagement between the connector parts is assured.

The offshore oil and gas industry has standardized on the use of ring gaskets of the type designated "RX" or "BX" by the API. Reference is made to the "API SPECIFICATION FOR WELL-HEAD EQUIPMENT", API Spec. 6A, Tenth Edition, March, 1974, American Petroleum Institute, Division of Production, Dallas, Tex., pages 33 and 34, for examples of such ring gaskets and companion grooves in flange connections. The present invention is particularly directed towards supporting and positioning such ring gaskets, but is also applicable to the type "R" ring gaskets, see the API specification, page 32, for examples.

Connectors of the type here involved, because of the standards by which the parts are made, cannot be easily or acceptably modified in a significant manner. The connectors using the "RX" type ring gaskets are made up with a load carrying spacer ring between the confronting faces having the grooves which receive the ring gasket or with the confronting faces in engagement. Any variation may result in an ineffective loading of the ring gasket by the sealing walls which form one side of the grooves. On the other hand, "BX" type ring gaskets are normally used in connectors which are made up with the opposing, groove containing surfaces in abutting engagement, and the ring gasket may be deformed into engagement with both side walls of one or both of the grooves.

Broadly speaking, the invention relates to supporting and positioning the ring gasket for engagement in the grooves of the connector or flange parts. Specifically, the invention relates, to supporting and positioning the ring gasket of the above identified "RX" type for engagement in the grooves of the connector or flange part by means of a spacer ring or flange part which limits the movement of the connector parts together, the ring gasket being initially loaded between opposing groove surfaces in the respective connector parts and being pressure loaded from within the connector. In the forms of the invention herein disclosed, in a specific sense, the spacer is a ring connected to or supportable adjacent to one connector part or an abutment flange portion and having means frictionally holding the ring gasket in position in the groove of that part in contact with the outer marginal sealing wall of the groove, so that when the companion connector part is assembled against the gasket ring, the ring will engage the other outer sealing wall and be loaded between the sealing walls, to an extent determined by the spacer or flange portion for pressure response from the internal fluid to maintain the seal over the full range of pressures for which the connector is designed.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 2 is an enlarged fragmentary longitudinal section taken on the line 2—2 of FIG. 1;

FIG. 5 is an enlarged fragmentary radial section as taken on the line 5—5 of FIG. 3, but illustrating one form of ring gasket retainer, before make up of the connection;

FIG. 6 is a fragmentary radial section generally corresponding to FIG. 5 but showing another form of ring gasket retainer;

FIG. 7 is another fragmentary radial section showing a further form of ring gasket retainer;

FIG. 8 is a fragmentary radial section also showing another form of ring gasket retainer; and FIG. 9 is a fragmentary radial section showing still a further form of ring gasket retainer.

Figure 1:
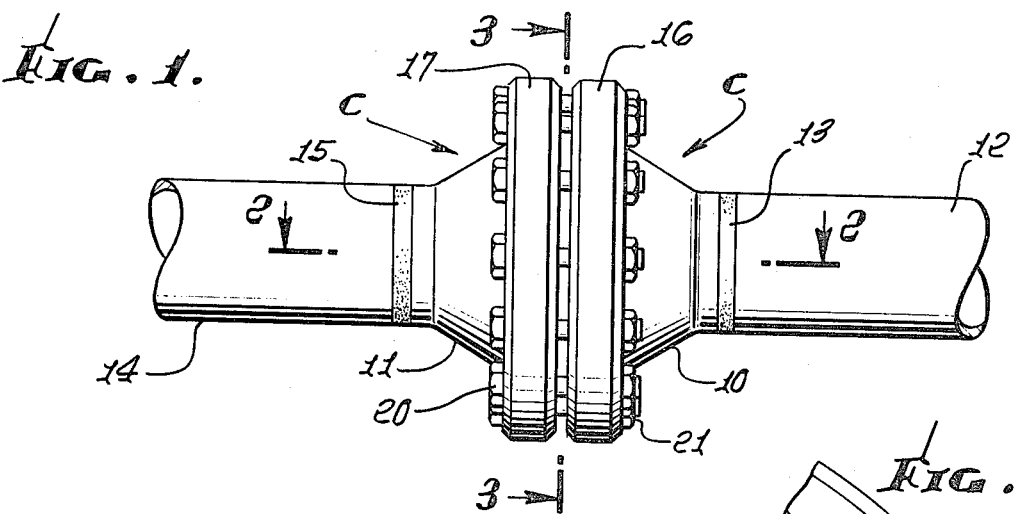
FIG. 1 is a side elevation showing a pipe connector incorporating the ring gasket retainer for flanged connectors embodying the invention.
Figure 3:
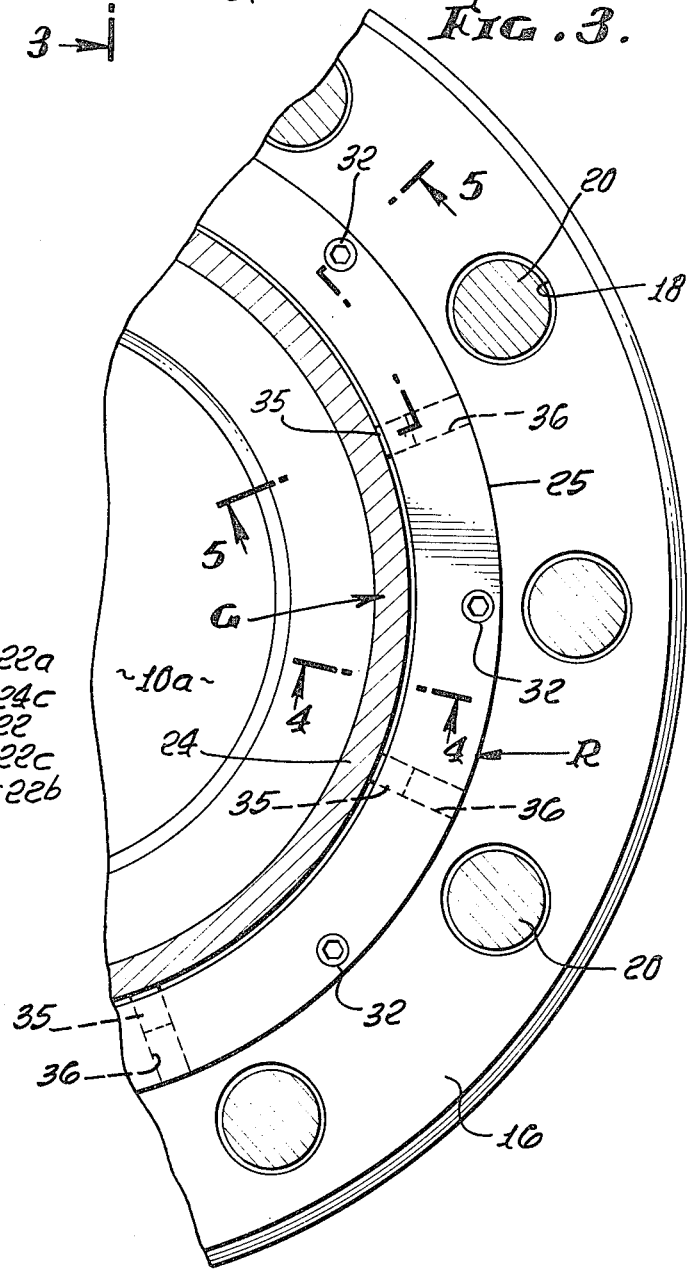
FIG. 3 is an enlarged fragmentary transverse section taken on the line 3—3 of FIG. 1.

As seen in the drawings, a pair of mating connector parts, in the form of flanged connectors C, having tubular housings 10 and 11. One length of pipe 12 is secured to the connector housing 10 by a circumferentially continuous weld 13 and another length of pipe 14 is secured to the other connector housing 11 by a circumferentially continuous weld 15. Each connector housing 10 and 11 has a radially outwardly projecting, circumferentially continuous connector flange designated 16 and 17, respectively. The flange 16 has a suitable number of circumferentially spaced bolt holes 18 and the flange 17 has a corresponding plurality of bolt holes 19, adapted to be aligned when the flange connector is being made up, for the reception of bolts 20, and retaining nuts 21 are adapted to be tightened down on the bolts to load the flanges 16 and 17 together, with a ring gasket G axially preloaded in opposing annular grooves 22 and 23 in the respective connector parts 10 and 11, so that the ring gasket will prevent leakage between the flanges 16 and 17. Such connectors of the flanged type, employing soft iron ring gaskets G, are generally the subject of the above identified API specification for well head equipment.

Typically when such connectors are being made up and the angle of the pipe is such that the ring gasket does not tend to seat in one of the opposing grooves to be held by gravity in a proper position for engagement between the flanges, the gasket must be manually held in position. Even in the case of fairly large pipe connectors, the holding of the ring gasket in initial position can be hazardous and very difficult, particularly in the case of underwater connections which are being made by divers who are wearing diving gear and gloves which make such manual activities very difficult.

The present invention provides retaining means R for initially supporting the ring gasket G and holding the same in a proper position with respect to one of the grooves in one of the connector parts, while the other connector part is being moved into place and the bolt holes 18 and 19 aligned for reception of the bolts 20 and the application thereto of the nuts 21.

The retaining means are, as herein illustrated in a specific sense, incorporated in spacer means which also function to limit the loading of the connector flanges towards one another and establish a predetermined spaced relation between the flanges and correspondingly between the opposing grooves 22 and 23, for the proper seating, loading and sealing effect of the ring gasket G.

Figure 4:
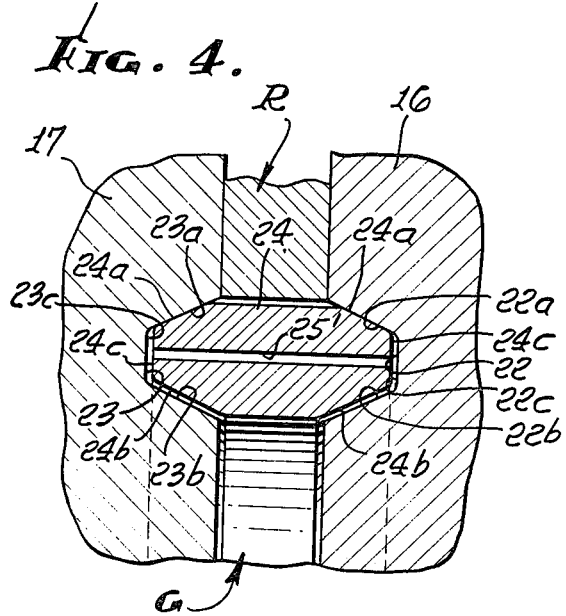
FIG. 4 is a further enlarged fragmentary detailed view in radial section taken on the line 4—4 of FIG. 3.

As seen in FIG. 4, the ring gasket G is in preloaded and sealing relation to the opposing flanges 16 and 17 in the opposing respective grooves 22 and 23. The groove 22 is formed in the flange or member 16 by an outer, inclined circumferentially continuous sealing wall 22a, an opposing inner, inclined wall 22b diverging from a base or bottom wall 22c. Correspondingly, the groove 23 in the flange 17 is formed by an outer, inclined, circumferentially continuous sealing wall 23a and an opposing inclined, inner wall 23b diverging from a base wall 23c. The ring gasket G has a central ring body 24, at each end of which is an outer beveled or tapered wall 24a, adapted to sealingly engage against the opposing inclined walls 22a and 23a of the respective flanges, when the connector parts are brought together by the bolts 20 and nuts 21. Engagement of the confronting beveled walls 22a and 23a with the gasket ring walls 24a establishes an axial and circumferential preload between these sealing flange and gasket ring walls.

The retainer means R, to be more particularly described below, serves to limit movement of the flanges 16 and 17 towards one another, and it is desired that the resultant predetermined spacing between the flanges is such that the opposite end surfaces or walls 24c of the ring gasket are not in sealing contact with the base walls 22c and 23c of the respective grooves, and that neither of the inner peripheral angular surfaces 24c at the opposite ends of the ring gasket body are in sealing engagement with the respective groove walls 22b and 23b.

When the connector is properly made up and the ring gasket G is in proper position, as just described above, it will be observed that the pressure of fluid within the fluid passages 10a and 11a of the connector acts across the entire inner periphery of the ring gasket to establish a high pressure loaded unit loading of the opposed angular surfaces 22a and 24a and the opposed angular surfaces 23a and 24a of the flanges and the ring gasket, so that the connector can withstand high pressures, without leaking. In the event that one of the angular ring gasket walls 24b should be caused to engage one of the flange walls 22b or 23b, then fluid pressure can pass between the ring gasket and the other of the walls 22b or 23b to find access to the space between the end surfaces 24c of the ring gasket and the base 22c or 23c of the grooves and can be equalized across the ends of the ring gasket by access to the base of the other groove, through equalizing port or ports 25, which extend longitudinally through the ring gasket body 24 at a suitable number of circumferentially spaced locations. Such ports 25 are required in some API ring gaskets, but not in others.

Referring more particularly to FIG. 5, the ring gasket retaining means R are adapted to initially support the ring gasket body 24, with one tapered end thereof disposed within the groove 22, and with the other tapered end of the body 24 disposed for engagement within the companion flange groove when the connector is assembled.

Accordingly, the retaining means R comprises an annular support member 25 projecting axially from the end face 26 of the flange 16, and having a flat end face 27 engageable by the opposing end face 28 of the other flange 17, when the connector is assembled, to maintain the proper axial spacing of the two connector parts, so that the ring gasket G is properly preloaded and pressure responsive as described above.

To accomplish this, the ring gasket G is supported within the retainer ring 25 by means 29 and the retainer ring is positioned or located relatively to the flange 16 so that the ring gasket body has its beveled outer surface 24a initially disposed as seen in FIG. 5 immediately adjacent to or contacting the outer angular wall 22a of the groove 22 in the flange 16, and the support means 29 mount the support ring 25 on the ring gasket body 24 in such a manner that when the companion connector flange 17 is loaded against the spacer ring 25, the ring gasket body is enabled to shift axially to the extent necessary to axially and circumferentially load the opposing angular walls of the ring gasket and the flange grooves.

In the embodiment of FIG. 5, the spacer ring 25 is mounted against the end face 26 of the flange 16 by means of a suitable number of screw fasteners 30 having stems threaded into bores 31 in circumferentially spaced relation about the flange 16, the fasteners having heads 32 recessed in counter bores 33 in the outer side of the support ring 25, the screw heads having suitable tool engaging recesses 34 enabling them to tightly force the support ring 25 against the flange face 26. In this form, the supporting means 29 for supporting the ring gasket in the supporting comprise a suitable number of set screws 35, threaded in radial bores 36 provided at a suitable number of circumferentially spaced locations in the support ring 25, intermediate the fasteners 30 which hold the ring 25 against the flange. These set screws 35 are suitably formed at their tip as by the provision of a central conical depression, with a hollow conical tip 38 adapted to frictionally engage or slightly bite into the soft iron ring gasket when the set screw is rotated by a suitable tool means, engageable in a tool recess 39. The set screws 35 are tightened against the periphery of the ring gasket body 24 sufficiently to supportively engage the same, while enabling the slight axial movement necessary to effect a preload of the ring gasket, as described above. Accordingly, it is now apparent that the retainer means are adapted to properly position the ring gasket G with respect to the one flange 16 and for engagement by the other flange 17, when the connector parts are bolted together.

Referring to FIG. 6, another form of the retaining means R for the ring gasket is shown. In this form, the retaining means includes a supporting ring 125 adapted to be supported and positioned with respect to the end face 126 of the flange 16, with the outer face 127 of the supporting means disposed for engagement by the confronting face of the other connector flange 17. The support ring 125 is a split ring, split at 125a, and on its face confronting the flange face 26 is a circumferentially extended flange 125b engageable in a groove 125c in the flange 16 to concentrically locate the support ring 125 with respect to the flange groove 22. The outer peripheral wall 125d forming the groove 125c and the outer peripheral wall 125e on the positioning flange 125b are correspondingly inclined for wedging co-engagement, so that as the fastening screws 130 are threaded into the threaded bores 131 in the flange 16, the screw heads 132, engaging the base of the counter bore 133 in the support ring 125, pull the support ring against the end face 26 of the connector flange 16, the entire support ring 125 is circumferentially contracted, so that the inner periphery of the ring 125 is brought into tight supporting engagement with the outer periphery of the ring gasket body 24. Such contraction of the support ring 125 is permitted by enlarging the screw holes 130a in the support ring 125 to permit radial movement of the support ring. At the inner periphery of the support ring 125, it is provided with circumferentially extended ribs or teeth 138, which may be formed as a thread and which are caused to bite into the outer periphery of the ring gasket and carry it into its initial position with the opposing inclined surfaces 22a of the groove 22 and 24a of the ring gasket disposed in or nearly in engagement and properly positioned for the subsequent making up of the connection, when the flange 17 is secured to the flange 16 by the bolts 20. The teeth 138 have their outer surfaces or flanks 139 sloped so as to offer little resistance to such axial movement of the ring gasket body 25 as may occur in the final makeup of the connector.

Referring to FIG. 7, another form of the retaining means R is illustrated. In this form, the supporting means comprises an axially projecting flange 225, integral with the connector flange 16 and providing the circumferentially extended and radial face 227, adapted for abutting engagement by the opposing flat face of the flange 17, to establish the standoff between the two flanged connector parts, so that the opposing angular surfaces within the flange grooves 22 and 23 and on the ring gasket G are properly loaded into sealing relation. The means 229 for connecting the ring gasket G to the support flange 225 in this form, comprises a suitable number of circumferentially spaced set screws 235 threadedly engaged in radial bores 236 in the support flange 225 and having a hollow, conical tip 238 adapted to tightly engage or bite into the outer periphery of the ring gasket body 24. Here again, the set screws 235 properly position or support the ring gasket G, with the inclined outer surface 24a thereof disposed in or close to engagement with the outer inclined wall 22a forming the groove 22 in the flange 16, so that when the companion connector flange 17 is bolted against the flange 16, the ring gasket is properly energized, as shown in FIG. 4.

In FIG. 8, another form of retaining means R is illustrated. In this form, a support ring 325 is adapted to be located or positioned in engagement with the end face 326 of the connector flange 16 and provides a radial flat face 327 confronting the opposing connector flange 17, when the connector parts are joined together. In this case, the support ring 325 is adapted to be located adjacent the connector flange 16 by means of a suitable number of circumferentially spaced and radially extended rods 330, threadedly engaged at their inner ends in radially threaded bores 331 spaced about the outer periphery of the support ring 325. Such a structure allows the ring 325, of the retainer means R, which supports the ring gasket G to be easily manually held by a diver or by an underwater manipulator to position the ring gasket body 24 with the opposing inclined groove surface 22a and ring surface 24a in or nearly in engagement, so that when the companion connector flange 17 is made up with the flange 16, the ring gasket 24 will be effectively loaded as shown in FIG. 4. The connecting means 329, in this embodiment comprises a plurality of set screws 335 threaded in circumferentially spaced, radial bores 336, at the inner periphery of the support ring 325, and having conical pointed ends 338 frictionally engageable with or adapted to bite into the outer periphery of the ring gasket body upon rotation of the set screws, by the application of a suitable tool to the tool receiving recesses 339 in the outer ends of set screws 336.

Referring to FIG. 9, another form of retaining means R is shown. In this form the support ring 425 is again adapted to be engaged with the end face 426 of the connector flange 16 and provides the outer radial face 427, engageable by the companion connector flange 17, upon inter-connection of the parts, so as to preload the ring gasket G, as illustrated in FIG. 4. The means for locating the support ring 425, in this form, comprises a suitable number of circumferentially spaced tabs 430, integral with the support ring 425 and projecting radially therefrom, the tabs having portions 431 adapted to be bent around or formed to be placed around the outer periphery of the flange 416, with end extremeties 432 bent radially inward, in engagement with the flange 16 to assist in securing the tabs and the support ring 425 in place. In this form, the connector means 429 comprises a plurality of circumferentially spaced, radial set screws 435 threaded in radial bores 436 in the support flange 425 and having conical tips or points 438, adapted for frictional engagement with or adapted to bite into the outer periphery of the ring gasket body 24 and support the same, in response to the application of a tool to the drive socket 439 of the set screws 435, while enabling the ring gasket G to be axially preloaded and circumferentially, resiliently deformed, upon making up of the connection, as previously described.

From the foregoing it will now be apparent that the several retainer means R described above all cooperate with the connector flange in such a manner as to properly position the soft iron ring gasket with respect to one connector flange, regardless of the angular disposition of the connector flange, until the companion connector flange is moved into position and connected to the first mentioned flange to engage and properly preload and deform the ring gasket in the grooves between the opposing flanges. In addition, each of the supports for the ring gasket provides a predetermined standoff between the flange connection, so that ring gaskets of the "RX" type, as identified above, are properly loaded to be pressure responsive across the entire inner periphery of the ring gasket to effect a high unit loading of the opposed tapered sealing surfaces of the gasket ring within the grooves.

I claim:

1. In a connector: a pair of connector bodies having a fluid passage therein when said bodies are connected together, said bodies having opposed radial surfaces with circumferentially continuous grooves circumscribing said fluid passage and defined between inner and outer side wall converging outwardly from the bottom of the groove, a metal gasket ring in said grooves in sealing and radially inwardly loaded engagement with at least said outer side walls, retainer means carried by one of said bodies, means connecting said retainer means to said gasket ring and initially holding said gasket ring in position with respect to the groove in one of said bodies to be clamped between said bodies in said grooves with at least said outer side walls loaded against said gasket ring, and means independent of said retainer means clamping said bodies together, said retainer means being engaged by and clamped between said bodies and limiting the load of said gasket ring by said walls.

2. In a connector as defined in claim 1; said retainer means being connected to said one of said bodies.

3. In a connector as defined in claim 1; said retainer means being a spacer ring clamped between said radial surfaces by said clamping means.

4. In a connector as defined in claim 1; said retainer means being a spacer ring clamped between said radial surfaces by said clamping means, said gasket ring having inner peripheral and end walls spaced from said inner side walls of said grooves and from the bottom of said grooves.

5. In a connector as defined in claim 1; said retainer means being a spacer ring clamped between said radial surfaces by said clamping means, and said gasket ring having passage means extending longitudinally thereof between said grooves.

6. In a connector as defined in claim 1; said means connecting said retainer means to said gasket ring including means enabling axial and circumferential deformation of said gasket ring during loading of said gasket ring.

7. In a connector as defined in claim 1; said retainer means being connected to said one of said bodies, said means connecting said retainer means to said gasket ring including means enabling axial and circumferential deformation of said gasket ring during loading of said gasket ring.

8. In a connector as defined in claim 1; said retainer means comprising a spacer ring clamped between said bodies, said gasket ring being within the inner periphery of said ring member, and said means connecting said retainer means to said gasket ring being disposed between the inner periphery of said spacer ring and the outer periphery of said gasket ring.

9. In a connector as defined in claim 1; said retainer means comprising a spacer ring clamped between said bodies, said gasket ring being within the inner periphery of said spacer ring, and said means connecting said retainer means to said gasket ring providing a tight fit between the inner periphery of said spacer ring and the outer periphery of said gasket ring.

10. In a connector as defined in claim 1; means connected to said retainer means for supporting said gasket ring in its initial position.

11. In a connector as defined in claim 1; means connected to said retainer means for supporting said gasket ring in its initial position, including circumferentially spaced fasteners engaged between said retainer means and said one of said bodies.

12. In a connector as defined in claim 1; means connected to said retainer means for supporting said gasket ring in its initial position, including circumferentially spaced thin tabs projecting from said retainer means and extending over the outer periphery of said one of said bodies.

13. In a connector as defined in claim 1; means connected to said retainer means for supporting said gasket ring in its initial position, including circumferentially spaced thin tabs projecting from said retainer means and extending over the outer periphery of said one of said bodies, said tabs having free ends turned inwardly into engagement with said one of said bodies.

14. In a connector; a pair of connector bodies having a fluid passage therein when said bodies are connected together, said bodies having opposed radial surfaces with circumferentially continuous grooves circumscribing said fluid passage and defined between inner and outer side walls converging outwardly from the bottom of the groove, a metal gasket ring in said grooves in sealing and radially inwardly loaded engagement with at least said outer side walls, retainer means, means connecting said retainer means to said gasket ring and initally holding said gasket ring in position with respect to the groove in one of said bodies to be clamped between said bodies in said grooves with at least said outer side walls loaded against said gasket ring, and means clamping said bodies together, said retainer means being clamped between said bodies and limiting the loading of said gasket ring by said walls; said retainer means comprising a spacer ring clamped between said bodies, said gasket ring being within the inner periphery of said spacer ring, and said means connecting said retainer means to said gasket ring including gripping means within said spacer ring, and means for forcing said gripping means into engagement with the outer periphery of said gasket ring.

15. In a connector as defined in claim 14; said gripping means comprising a plurality of set screws carried by said spacer ring and engaged with said gasket ring at circumferentially spaced locations.

16. In a connector as defined in claim 14; said spacer ring being radially split, said gripping means comprising circumferentially extended teeth on the inner periphery of said spacer ring, said means for forcing said gripping means including wedge surfaces on said support ring and said one of said bodies contracting said spacer ring upon engagement of said spacer ring with said radial surface of said one of said bodies.

17. In a connector as defined in claim 14; said spacer ring being radially split, said gripping means comprising circumferentially extended teeth on the inner periphery of said spacer ring, said means for forcing said gripping means including wedge surfaces on said support ring and said one of said bodies contracting said spacer ring upon engagement of said spacer ring with said radial surface of said one of said bodies, and means connecting said spacer ring to said one of said bodies for forcing said spacer ring into engagement with said radial surface of said one of said bodies and allowing contraction of said spacer ring.

18. In a connector as defined in claim 14; said spacer ring being an annular flange integral with said one of said bodies.

19. In a connector as defined in claim 14; said spacer ring being an annular flange integral with said one of said bodies, said gripping means comprising set screws spaced about said annular flange and engaged with said gasket ring.

20. In a connector as defined in claim 14; means connected to said spacer ring for supporting said gasket ring in its initial position.

21. In a connector as defined in claim 14; means connected to said spacer ring for supporting said gasket ring in its initial position, including rods radiating from said spacer ring for manual engagement.

22. In a connector as defined in claim 14; means connected to said spacer ring for supporting said gasket ring in its initial position, including circumferentially spaced fasteners engaged between said spacer ring and said one of said bodies.

23. In a connector as defined in claim 14; means connected to said spacer ring for supporting said gasket ring in its initial position, including circumferentially spaced thin tabs projecting from said spacer ring and extending over the outer periphery of said one of said bodies.

24. In a connector as defined in claim 14; means connected to said spacer ring for supporting said gasket ring in its initial position, including circumferentially spaced thin tabs projecting from said spacer ring and extending over the outer periphery of said one of said bodies, said tabs having free ends turned inwardly into engagement with said one of said bodies.

25. In a connector; a pair of connector bodies having a fluid passage therein when said bodies are connected together, said bodies having opposed radial surfaces with circumferentially continuous grooves circumscribing said fluid passage and defined between inner and outer side walls coverging outwardly from the bottom of the groove, a metal gasket ring in said grooves in sealing and radially inwardly loaded engagement with at least said outer side walls, retainer means, means connecting said retainer means to said gasket ring and initially holding said gasket ring in position with respect to the groove in one of said bodies to be clamped between said bodies in said grooves with at least said outer side walls loaded against said gasket ring, and means independent of said retainer means clamping said bodies together, said retainer means being engaged by and clamped between said bodies and limiting the loading of said gasket ring by said walls; means connected to said retainer means for supporting said gasket ring in its initial position, including rods radiating from said retainer means for manual engagement.

26. In a connector, a pair of connector bodies having a flow passage therethrough, said bodies having opposed circular walls circumscribing said flow passage and converging outwardly from said flow passage and radially projecting opposed walls, a metal ring gasket having outer peripheral surfaces engaged between said circular walls in sealing and axially and radially inwardly loaded relation, and support means connected to said ring gasket and one of said radial walls and initially holding said ring gasket in position with respect to the circular walls in one of said bodies, and means independent of said support means clamping said bodies together to load said walls against said ring gasket, pressure of fluid in said flow passage acting between said radially projected walls to load said ring gasket outwardly into sealing engagement with said walls, said support means being between and engaging said radially projecting walls radially outwardly from said ring gasket limiting movement of said radially projecting walls towards one another and loading of said ring gasket surfaces by said circular walls.

27. For use in a connector having connector parts with opposed annular divergent sealing surfaces for receiving and axially and circumferentially loading a soft metal ring gasket: a sub-assembly comprising a support ring, a ring gasket within said support ring, and connecting means engaged between said support ring and said ring gasket enabling axial movement of said ring gasket with respect to said support ring; said connecting means comprising set screws circumferentially spaced about said support ring.

28. For use in a connector having connector parts with opposed annular divergent sealing surfaces for receiving and axially and circumferentially loading a soft meatl ring gasket: a sub-assembly comprising a support ring, a ring gasket within said support ring, and connecting means engaged between said support ring and said ring gasket enabling axial movement of said ring gasket with respect to said support ring; said connecting means comprising teeth on the inner periphery of said support ring.

* * * * *